Feb. 15, 1966 J. L. D. MORRISON ETAL 3,235,265

MAGNETIC RECORDER-REPRODUCER APPARATUS

Filed May 11, 1962 6 Sheets-Sheet 1

INVENTORS.
JAMES L. D. MORRISON.
MICHAEL H. ESTKOWSKI.
BY
Lockwood, Galt, Woodard + Smith.
ATTORNEYS.

Feb. 15, 1966 J. L. D. MORRISON ETAL 3,235,265

MAGNETIC RECORDER-REPRODUCER APPARATUS

Filed May 11, 1962 6 Sheets-Sheet 2

INVENTORS.
JAMES L.D. MORRISON,
MICHAEL H. ESTKOWSKI.
BY
Lockwood, Galt, Woodard & Smith,
ATTORNEYS.

INVENTORS
James L. D. Morrison
and Michael H. Estkowski
BY Brown, Jackson,
Boettcher & Dienner
Att'ys.

INVENTORS
James L. D. Morrison
and Michael H. Estkowski
BY Brown, Jackson,
Boettcher & Dienner
Att'ys INVENTORS
James L. D. Morrison
and Michael H. Estkowski
BY Brown, Jackson,
Boettcher & Dienner
Att'ys INVENTORS
James L. D. Morrison
and Michael H. Estkowski
BY Brown, Jackson, Boettcher & Dienner
Att'ys 3,235,265
MAGNETIC RECORDER-REPRODUCER APPARATUS James L. D. Morrison, Los Angeles, and Michael H. Estkowski, Sun Valley, Calif.; said Estkowski assignor to V-M Corporation, Benton Harbor, Mich., a corporation of Michigan Filed May 11, 1962, Ser. No. 195,665
22 Claims. (Cl. 274—11)

This application is a continuation-in-part of our pending application Serial No. 771,413, filed November 3, 1958, entitled, Magnetic Recorder-Reproducer Apparatus, now abandoned.

This invention relates generally to magnetic recorder-reproducer apparatus and more particularly, to apparatus of this character wherein the recording medium is in the form of a flat sheet having a multiplicity of sound tracks.

Conventional magnetic recorder-reproducers are adapted to record on or reproduce from the magnetic medium in the form of a tape. The tape normally is stored on a reel and is played on a machine adapted to pass the tape over a magnetic recording or reproducing head and store the tape on a second reel. After the tape has been recorded or reproduced, the machine is adapted to rewind the tape on its original storage reel for subsequent playing.

Because of the fact that reels of tape are relatively difficult to store as compared with disc records, mechanisms have not been developed for continuously and automatically playing one tape after another as is conventional in connection with the playing of disc records. Accordingly, it is necessary in conventional tape recorders and reproducers to manually shift reels of tape after the playing of tape. The total non-aided length of playing time is determined by the total time required for playing one reel of tape.

Magnetic recorder-reproducer apparatus has been devised for utilizing a magnetic recording and reproducing medium in the form of a flat sheet. The sheet may be attached to a drum with the ends adjacent or overlapping one another, and the drum may be rotated for recording and reproducing sound. Apparatus of this type conventionally is used for recording and reproducing dictated matter and is not used for recording and reproducing music. Consequently, apparatus of this type has not met the sound reproducing quality requirements usually attaching to phonographs. For example, no means is provided in machines of this type for preventing an audible "click" when the recorder or reproducer head crosses the junction of the ends of the magnetic medium. Such an audible "click" would be intolerable in apparatus utilized for reproducing music.

An object of the present invention is to provide a magnetic recorder-reproducer apparatus adapted to handle a magnetic medium in the form of a flat sheet and to record sound thereon and reproduce sound therefrom continuously without interruption.

Another object of the invention is to provide a magnetic recorder and reproducer apparatus adapted to feed a magnetic medium in the form of a flat sheet for continuous magnetic scanning of one sound track after another on said sheet.

Still another object of this invention is to arrange a magnetic pickup head in apparatus of the character defined above in such a manner that it may scan one sound track after another without audible interruption of sound.

A further important object of the invention is to provide a magnetic recorder-reproducer device having a guide comprising spaced inner and outer stationary guide surfaces for receiving a sheet having magnetic material thereon and forming a convolute path of travel whereby the sheet may be driven through repeated cycles of travel around the path by drive means mounted adjacent the path.

An additional object of the invention is to provide a magnetic recorder-reproducer device adapted to handle a magnetic medium in the form of a sheet comprising means for periodically feeding the leading edge of the sheet into engagement with the trailing edge of the sheet prior to and during the passage of the edges across a recording and reproducing head.

A further object of the invention is to provide a method for recording sound on a sheet of magnetic material and reproducing sound therefrom wherein the leading edge of the sheet is periodically driven into engagement with the trailing edge of the sheet prior to and during the passage of the edges across recording and reproducing means.

A still further object of the invention is to provide a magnetic recorder-reproducer device adapted to handle a magnetic medium in the form of a sheet wherein a recording and reproducing head is fed across the path of travel of the sheet by head driving means which are responsive to movement of the sheet thus assuring coordination between movement of the head and movement of the sheet.

Another object of the invention is to provide a magnetic recorder-reproducer device adapted to handle a magnetic medium in the form of a sheet wherein a recording and reproducing head is positioned with its pole pieces inclined with respect to the leading and trailing edges of the sheet so that the head may traverse such edges without collapse of the magnetic field.

Other advantages and uses of our invention will be apparent, or become so, as we describe the invention in greater detail in conjunction with the accompanying drawings in which.

Figure 1:
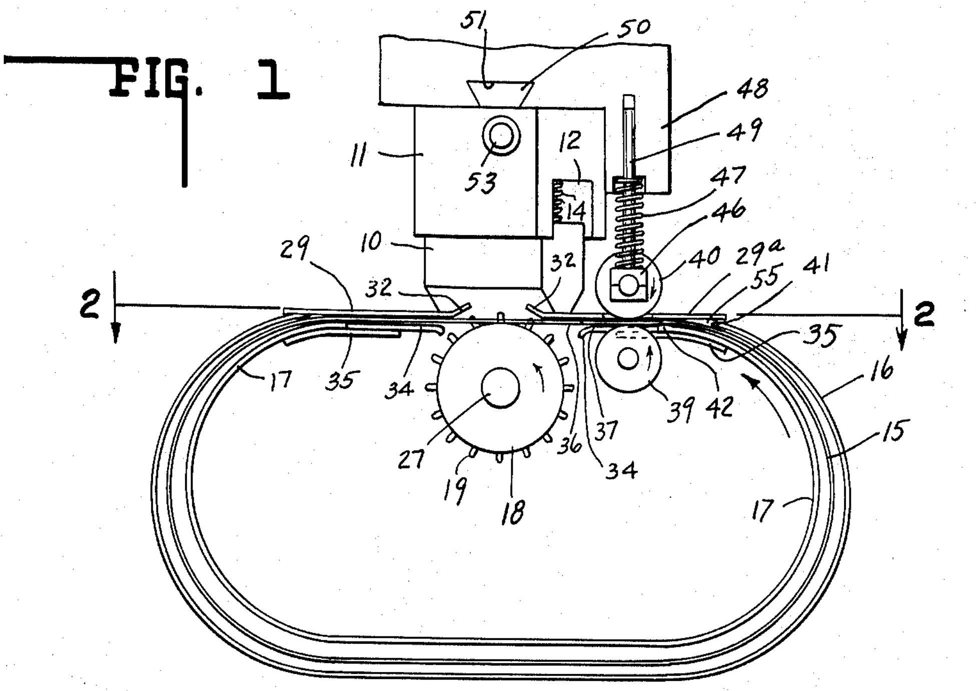
FIGURE 1 is a side elevation illustrating one embodiment of the apparatus of this invention with certain parts omitted.
Figure 2:
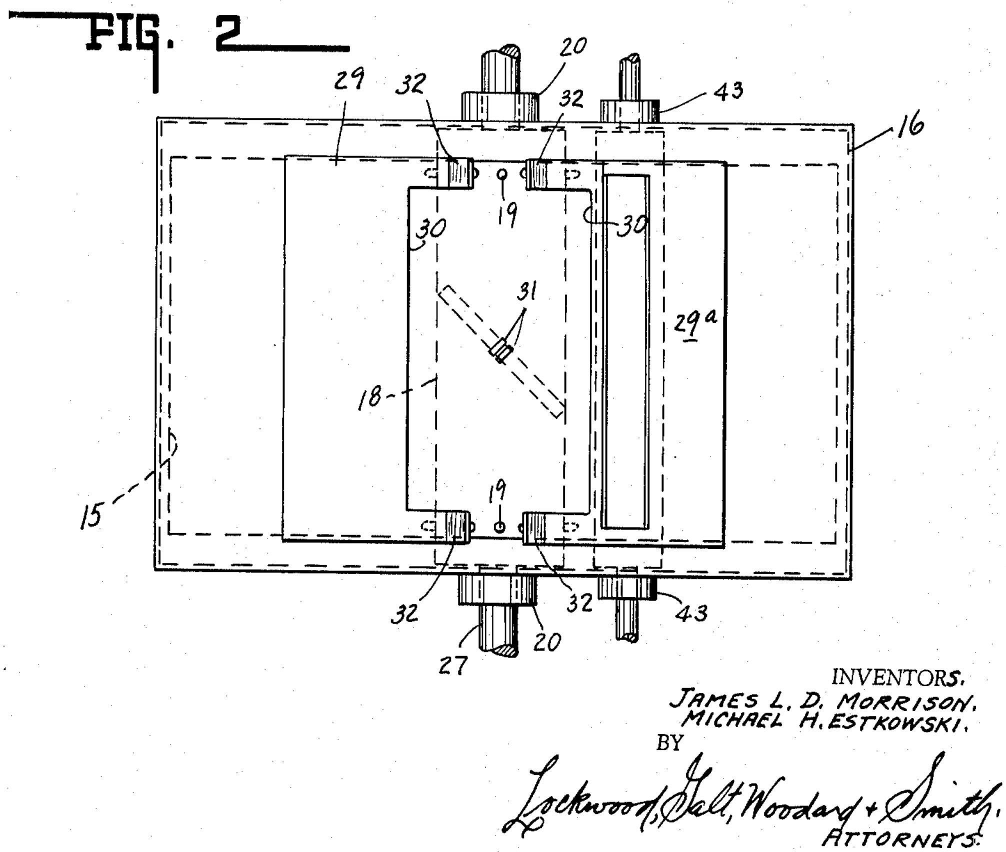
FIGURE 2 is a plan view taken substantially along line 2—2 of FIG. 1.
Figure 3:
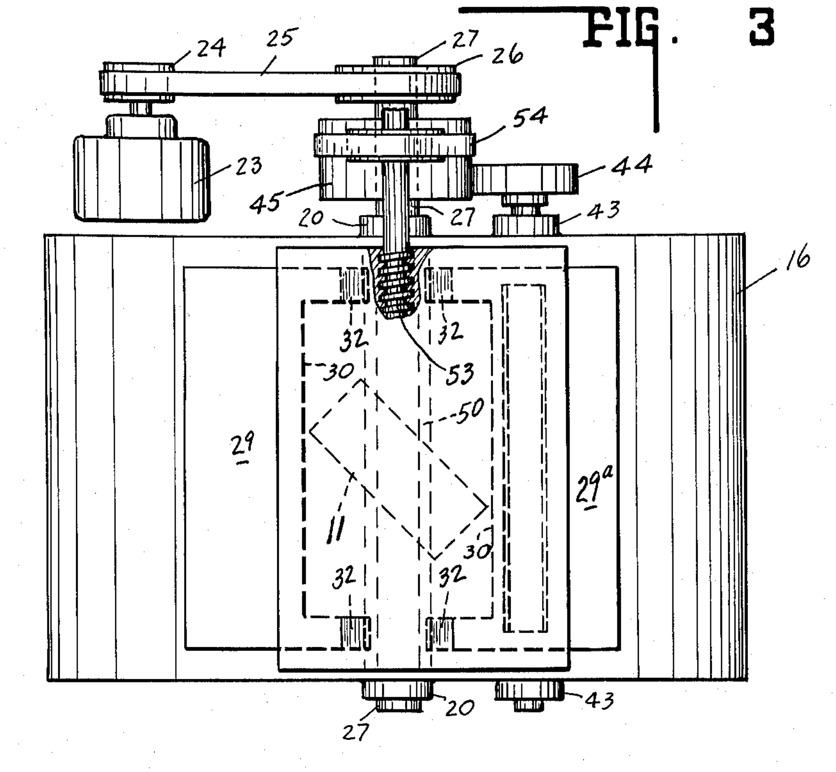
FIGURE 3 is a plan view of the apparatus shown in FIG. 1.

Referring to FIGURES 1–3, the embodiment of the invention there shown comprises a conventional magnetic pickup head 10 slidably mounted within a block 11 having a slot 12 for guiding the upward and downward movement of head 10. Suitable spring means 14 may be provided within the block 11 for pressing the magnetic head in a downward direction.

A magnetic recording and reproducing medium in the form of a flat sheet 15 is supported within a guiding apparatus comprising an outer wall 16 and an inner wall 17. It will be noted that walls 16 and 17 are spaced from one another whereby the over-all length of wall 16 is greater than the over-all length of wall 17. Because of this spaced relationship of the inner and outer walls, sheet 15 is free to move in a counterclockwise direction, for example, between the walls.

A sprocket 18 having teeth 19 at both ends thereof may be rotatably mounted in suitable bearings 20, the teeth 19 cooperating with sprocket holes 21 in the sheet 15. In the embodiment being described, sprocket 18 is driven from a motor 23 through a pulley 24 which is mounted on the motor shaft, belt 25, and a pulley 26 which is mounted on a shaft 27 of sprocket 18. For holding and guiding the sheet 15 in engagement with the teeth 19 of sprocket 18 there is provided a pair of guide plates 29 and 29*a* providing a slot 30 through which the head 10 projects so that pole pieces 31 of the head may engage the sheet 15 in intimate contact therewith. Plates 29 and 29*a* include upturned ears 32 which are in alignment with the sprocket teeth and serve to guide the sheet into engagement with the sprocket teeth and under the plate 29. A similar pair of guide plates 34 are supported by brackets 35 directly beneath the plates 29, 29*a* and spaced slightly therefrom whereby the sheet 15 may move between the guide plates and present a flat surface to the head 10. Brackets 35 may be attached in any suitable manner to inner wall 17.

As illustrated in FIGS. 1 and 2, the trailing edge 36 of sheet 15 is about to pass over the sprocket 18. For feeding the leading edge 37 of sheet 15 into driving engagement with sprocket 18, there is provided a pair of rollers 39 and 40 located immediately adjacent to the ends 41 and 42 of walls 16 and 17 respectively. Roller 39 may be mounted in suitable bearings 43 and provided with a drive pulley 44 (see FIGURE 3) frictionally engaging a pulley 45 mounted on the sprocket shaft 27 and driven thereby. Roller 40 may be supported in a pair of suitable bearings 46 and spring biased into engagement with sheet 15 by means of a pair of springs 47 which bear on the bearings 46 and on an overhead bridge structure 48. Bearings 46 may be provided with guide pins 49 extending into bridge 48 as shown in FIG. 1. In this manner, roller 39 in cooperation with roller 40 serves to drive leading edge 37 of sheet 15 into contact with trailing edge 36 as soon as the leading edge 37 is pushed into engagement with the rollers by the sprocket. It will be readily understood that the leading edge 37 will follow the trailing edge 36 into engagement with the teeth 19 of sprocket 18 whereby the sprocket will continue to drive the sheet 15.

The overhead bridge structure 48 supports the block 11 and the pickup head 10 at an angle to the ends of the sheet 15 as illustrated in FIGS. 1 and 2. The purpose of the angular relationship of the head to the ends of the sheet is to prevent distortion of sound as the edges 36 and 37 of sheet 15 move under the head as will be explained. Head 11 may be slidably supported in the bridge structure 48 by means of a keystone shaped slide 50 movably mounted within a cooperating keystone shaped slot 51.

Figure 4:
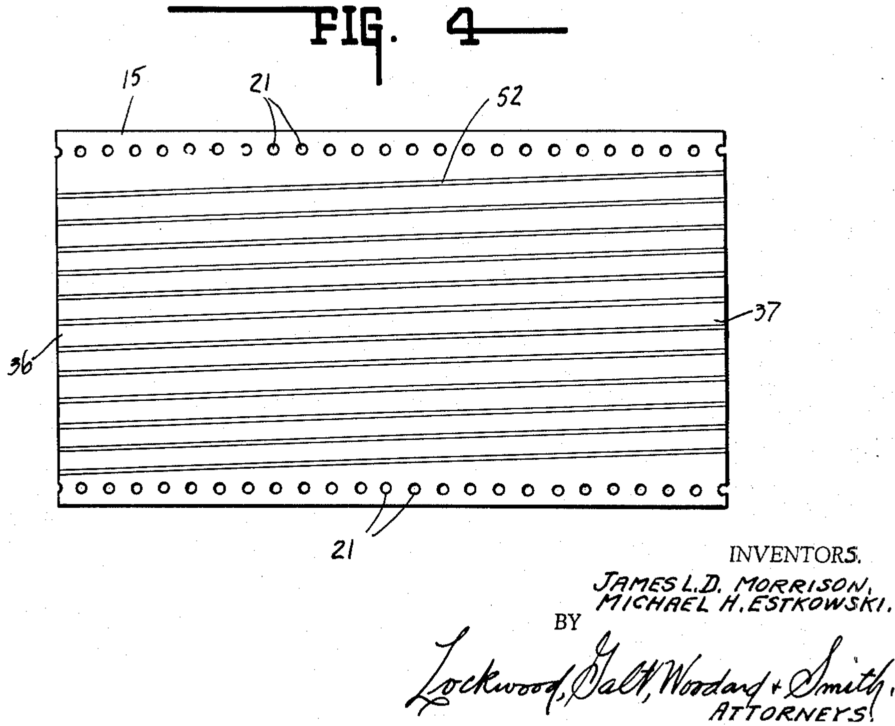
FIGURE 4 is a plan view of one form of record medium used in the apparatus of this invention.

The record sheet 15 may be rectangular, as shown in FIG. 4, and may be formed of or coated with any suitable conventional magnetic medium. If desired, the leading and trailing edges may be inclined so that the sheet forms a parallelogram. In order to provide a spiral record track on sheet 15 when the sheet is mounted, as shown in FIG. 1, information may be recorded magnetically on the sheet in the form of spaced lines 52 angularly disposed with respect to the sheet as illustrated in FIG. 4. It will be understood that when the sheet 15 is placed in the mechanism of FIG. 1, the end of one line recording at trailing edge 36 will abut the opposite end of an adjacent line at leading edge 37 thereby to provide the equivalent of a continuous spiral record line or sound track.

In order to cause the head 11 to follow the spiral sound track, there is provided a screw feed 53 (see FIGURES 1 and 3) extending through block 11 as shown. Screw feed 53 may be driven by motor 23 from a pulley 54 arranged in frictional engagement with pulley 45. It will be understood that the respective sizes of pulleys 45 and 54 may be arranged to correlate the speed of travel of sheet 15 and the rate of feed of head 11 so that the magnetic pole pieces 31 will follow the spiral sound track on the sheet. An alternative embodiment of the invention wherein such correlation is achieved by utilizing the movement of the sheet to drive the head feeding means will be described hereinafter.

Figure 5:
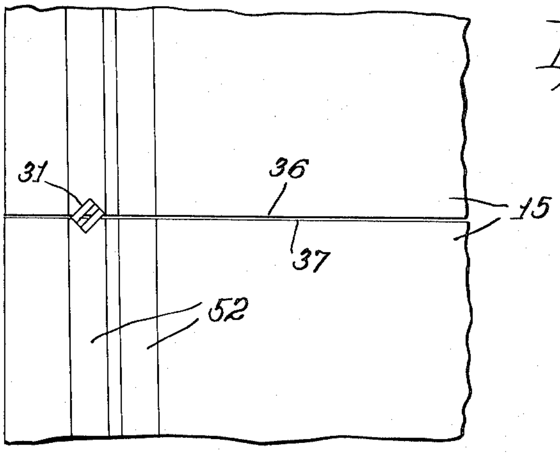
FIGURE 5 is an enlarged fragmentary plan view of the record medium illustrating the relationship of the recording head to the edges of the record sheet.

A further important feature of this invention is the arrangement of head 10 and pole pieces 31 at an angle other than 90° to the spiral sound track on sheet 15. In this manner the pole pieces 31 cross the gap between leading edge 37 and trailing edge 36 of sheet 15 without causing detectable sound distortion (FIG. 5).

The time interval during which the head gap, or the gap between pole pieces 31, crosses the gap between edges 36 and 37, or the magnetic medium gap, is held under 200 milliseconds. This is made possible by the fact that the magnetic medium gap can be held within 0.010 of an inch and the speed of the magnetic medium passing across the head gap is of a reasonable value to produce an average level of high frequency response. Under these conditions the decrease of information transfer level during the two gap cross over interval is undetected by the human ears. The latter's characteristics are such that changes of volume level lasting for less than 200 milliseconds are undetectable.

As shown in the drawings, the tilted head gap length in the direction of the record sheet, or magnetic medium, travel must be longer than the gap existing between the butted ends of the magnetic medium. This condition is necessary so the head gap at no time loses total contact with the magnetic medium. Although the head gap does not have complete contact with the magnetic portion of the magnetic medium when it crosses over the latter's gap, it nevertheless maintains a continuous magnetic circuit which precludes sudden surges of current in the magnetic head coils such as would occur had the head gap been parallel to the gap in the magnetic medium.

The degree of head gap tilting depends on the gap length, the width of magnetic medium gap, the allowable decrease of information pickup during gap cross over, the loss of information pickup level using standard available heads caused by decrease of magnetic medium area covered by head gap as opposed to area covered when head gap is not tilted, and slight variations of frequency response. This degree of tilting is not critical since the frequency response and information pickup level change at a slow rate up to an angle of 45 degrees, after which the above factors vary more rapidly. Under normal circumstances the head gap need not be tilted beyond 30 degrees. It will be understood that, if desired, the leading and trailing edges of the sheet may be inclined with respect to the path of travel of the sheet so as to incline the magnetic medium gap rather than the head gap, in which case the head and pole pieces could be disposed substantially perpendicular to the sound track. In actual practice, due to the close butting of the edges of the sheet, it may not always be necessary to incline the head or the edge of the sheet; so it is understood this invention is not limited to an inclined head or sheet edge.

In operation, a record sheet of the type illustrated in FIGURE 4 may be inserted through the opening at 55 between the outer wall 16 and the plate 29*a*. By moving this sheet between the rollers 39 and 40 it will be fed into operative engagement with the sprocket 18. It will be understood that the pickup head 10 will initially be positioned at the upper edge (FIGURE 2) of the record sheet and recording or reproduction will occur as the sprocket 18 feeds the sheet across the path of the pickup head.

The walls 16 and 17 guide the leading edge 37 of the sheet around to the point where trailing edge 36 will already have passed between rollers 39 and 40 and leading edge 37 will be forced between these rollers. At this point there will be a gap between the edges 36 and 37 due to the fact that wall 16 is slightly longer than wall 17. As soon as rollers 39 and 40 pick up the leading edge 37 it will be drawn forward into engagement with trailing edge 36 and plates 29*a* and 34 will guide leading edge 37 into engagement with sprocket 18. It will be understood that roller 39 is to be driven at a speed sufficient to push leading edge 37 into engagement with trailing edge 36 and to maintain such engagement until the edges traverse the head 10 and sprocket 18 picks up leading edge 37 and assumes driving relation therewith, after which slippage will occur in the drive for roller 39 to permit it to rotate at substantially the same peripheral speed as the sprocket.

As previously explained, the record lines on sheet 15 become a spiral record track when edges 36 and 37 are in engagement with one another. Consequently, the screw feed 53 moves head 10 transversely of sheet 15 to maintain the pole pieces 31 in proper magnetic linking relation to the record lines whereby the pickup head records or reproduces continuously as the sheet 15 is repeatedly rotated by the sprocket 18.

From the foregoing description of one embodiment of the present invention it will be apparent that this invention provides apparatus adapted to record and reproduce sound by means of a magnetic medium in the form of a flat sheet. It will be readily apparent that a flat record sheet can be handled and stored much more easily and economically than a reel of tape. Also a flat sheet is readily adaptable to automatic record changing apparatus; whereas, reels of tape must be handled manually in order to effect a shift from one reel to another. Also this invention provides an arrangement of the magnetic recording and pickup means whereby the flat sheet may be passed through repeated cycles of operation without effecting quality of recording or reproduction.

Figures 6, 7:
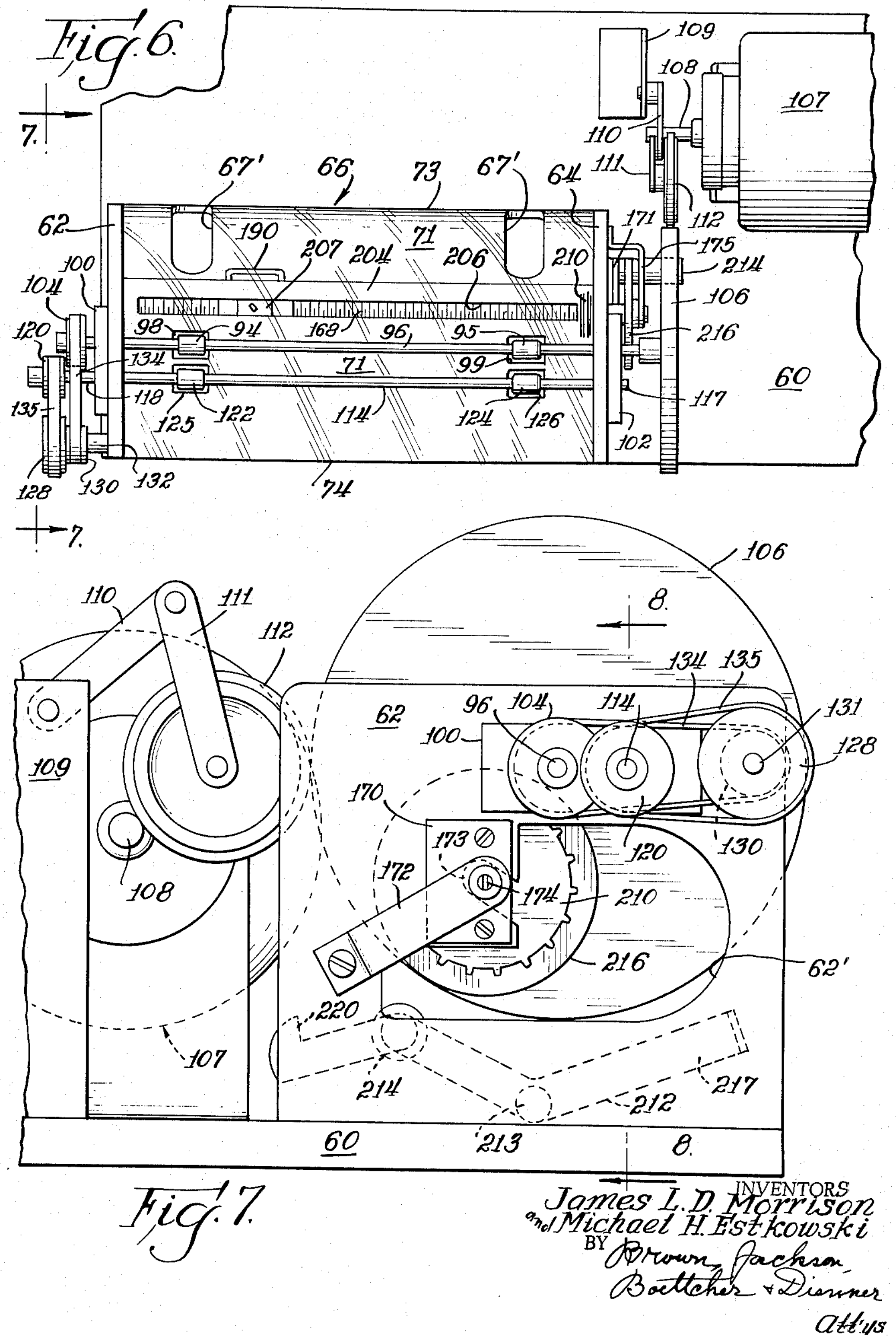
FIGURE 6 is a plan view, partly broken away, showing an alternative embodiment of the present invention.
FIGURE 7 is an enlarged side elevation taken substantially along the line 7—7 of FIGURE 6.

Reference is now made to FIGURES 6–15 which illustrate an alternative embodiment of the present invention. FIGURE 6 shows a base plate 60 on which are mounted a pair of vertical supporting side walls 62 and 64 apertured at 62′ and 64′ respectively (see FIGURES 7 and 8). A guide indicated generally at 66 extends between the side walls and is secured thereto. As shown best in FIGURE 11, the guide 66 comprises an outer stationary guide wall 67 having a pair of thumb openings 67′ (see FIGURE 6), and an inner stationary guide wall 68. The walls 67 and 68 are spaced from one another and in the embodiment shown comprise generally semi-circular end portions and substantially flat parallel intermediate upper and lower portions, and they define a convolute path of travel for a record sheet 70. Thus, the outer wall 67 comprises upper and lower portions 71 and 72 and semi-circular end portions 73 and 74, and the inner wall 68 comprises upper and lower portions 75 and 76 and semi-circular end portions 77 and 78. In the embodiment being described, the walls 67 and 68 are made of a transparent plastic material.

Figure 11:
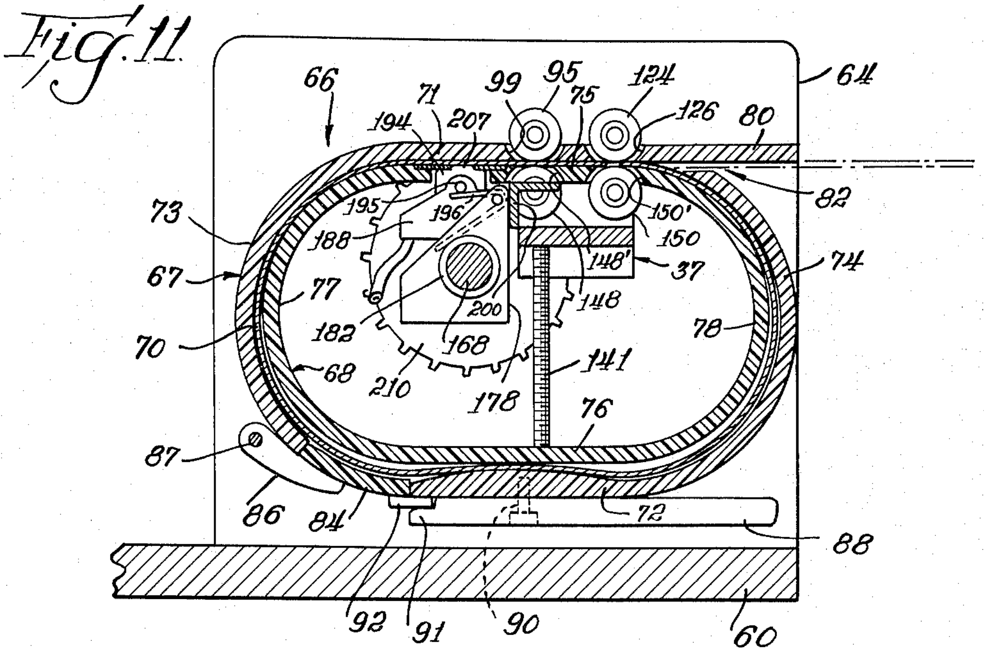
FIGURE 11 is a vertical section taken substantially along the line 11—11 of FIGURE 12.

The upper portion 71 of the outer wall 67 is provided with a substantially flat horizontal extension 80, and the semi-circular end portion 74 of the wall terminates in spaced relation to the extension 80 so as to provide an inlet opening 82 for insertion of the record sheet 70. The outer wall 67 is also provided with a movable gate or door 84 to permit ejection of a sheet from the guide 66. The gate 84 extends substantially the full length of the guide 66, and at each end of the gate there is secured a bracket 86, the brackets being hingedly mounted to the supporting side walls. Thus, as shown in FIGURE 11, a bracket 86 is secured to the end wall 64 by a pivot pin 87, and it will be understood that a similar bracket is attached at the opposite end of the gate 84, and hingedly secured to the side wall 62. An arm 88 is rotatably mounted to the underside of the bottom portion 72 of the outer wall 67 by a screw 90, and it will be understood that the gate 84 may be manually moved to closed position and the arm 88 then rotated to the position shown in FIGURE 11 wherein an end portion 91 on the arm will be positioned directly beneath a pad 92 carried by the gate so as to lock the gate in closed position. When the arm 88 is rotated so as to move the end 91 out from under the pad 92, the gate 84 will fall open due to gravity. When the gate is in closed position the sheet 70 may be driven through the convolute path formed by the guide 66 for repeated cycles of travel, and when the gate is opened the sheet will be ejected, as will be more fully explained hereinafter.

The means for driving a sheet record through repeated cycles of travel in the guide 66 comprises a pair of rollers 94 and 95 (see FIGURE 6) which are carried on a rod 96 which extends the full length of the guide and projects through the side mounting walls 62 and 64. The rollers 94 and 95 may comprise tubular sections made of rubber or the like which are fixedly mounted on the rod 96 and substantially spaced along the rod from one another. The upper portion 71 of the outer guide wall 67 is provided with openings 98 and 99 which permit the rollers 94 and 95 to project downwardly through the outer guide wall so as to be adapted to contact the sheet 70. In this manner, the sheet may be fed through the guide by rotation of the rod 96 in a clockwise direction as viewed in FIGURES 11, 13 and 14.

Still referring to FIGURE 6, a bearing support plate 100 is affixed to the side wall 62, and a bearing for supporting the rod 96 is mounted within the plate 100. In a similar manner, a plate 102 is secured to the opposite side wall 64 and carries a bearing for supporting the opposite end of the rod. The plates 100 and 102 may be secured to the corresponding side walls by screws or the like which pass through vertical slots in the plates so that the vertical position of the plates, and thus he rollers 94 and 95, may be adjused as desired.

Figure 8:
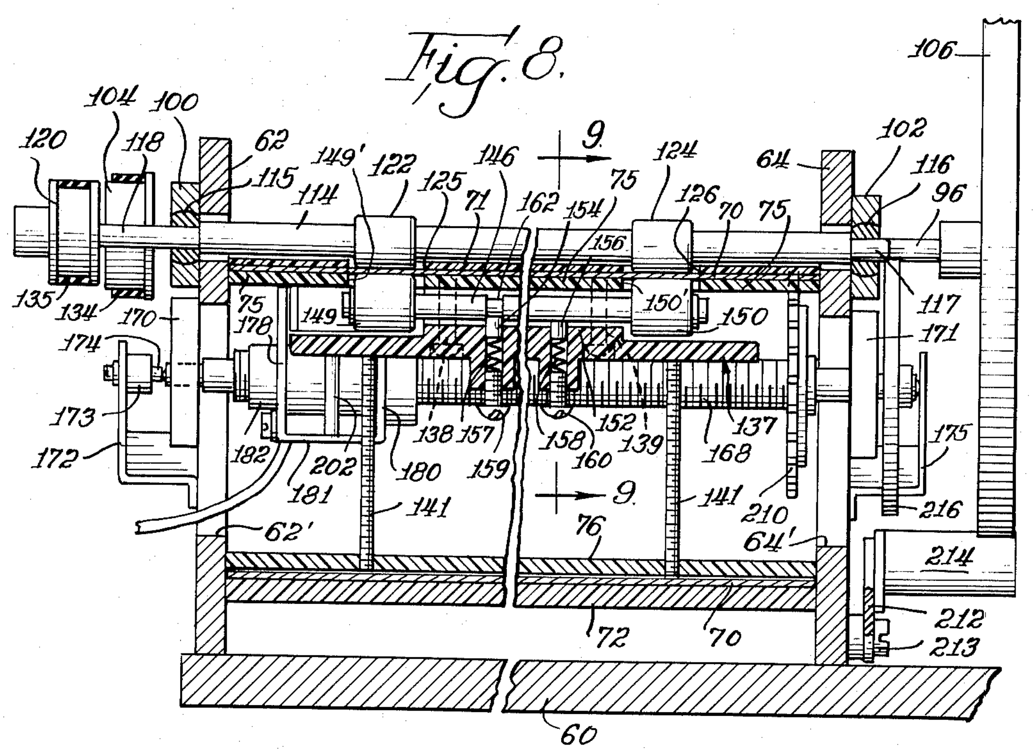
FIGURE 8 is a foreshortened vertical section taken substantially along the line 8—8 of FIGURE 7.

As shown in FIGURES 6 and 8, the left hand end of the rod 96 carries a pulley 104, and the right hand end of the rod carries a relatively large flywheel 106. FIGURE 6 also shows a motor 107 having a motor shaft 108. A bracket 109 is secured to the base 60 and a pair of pivotally mounted links 110 and 111 are supported from the bracket. The link 111 carries a rubber tired idler wheel 112 which when positioned as shown in FIGURE 6 will engage the rims of both the motor shaft 108 and the flywheel 106 whereby the motor will drive the flywheel which in turn will rotate the rod 96 and the rollers 94 and 95 mounted thereon.

A second rod 114 is mounted adjacent the rod 96 in substantially parallel relation thereto, and the ends of the rod 114 extend through bearings 115 and 116 (see FIGURE 8) which are mounted in the bearing support plates 100 and 102. As shown in FIGURES 6 and 8, the right hand end 117 of the rod 114 projects only slightly beyond the bearing support plate 102, whereas the left hand end 118 of the rod projects considerably further beyond the support plate 100 and carries a pulley 120 on the end thereof. It will be seen that the two ends 117 and 118 of the rod 114 are of reduced diameter so as to provide shoulders which bear against the inside faces of the bearing support plates 100 and 102 in order to axially position the rod. The rod 96 is maintained in proper axial position in a similar manner.

A pair of rollers 122 and 124 are mounted on the rod 114 in axially spaced relation so as to be positioned substantially in alignment with the rollers 94 and 95, respectively. The rollers 122 and 124 are similar to the rollers 94 and 95 and thus comprise tubular sections of rubber or the like which are fixedly mounted on the rod 114. A pair of apertures 125 and 126 are provided in the upper portion 71 of the outer guide wall 67 to permit the rollers 122 and 124 to project downwardly through the outer guide wall so as to be adapted to contact the record sheet 70. It will be seen that when the sheet 70 is inserted through the inlet 82, it will first be engaged by the rollers 122 and 124, and thereafter by the drive rollers 94 and 95.

FIGURE 6 shows a relatively large diameter pulley 128 mounted in alignment with the pulley 120, and a relatively small diameter pulley 130 mounted in alignment with the pulley 104. The pulleys 128 and 130 may comprise an integral unit which is carried on a rod or stud 131 (see FIGURE 7) which extends outwardly from the side wall 62. A spacer 132 is mounted on the rod between the pulley 130 and the side wall 62. An endless belt 134 is mounted on the pulleys 104 and 130, and a second endless belt 135 is mounted on the pulleys 120 and 128, whereby upon rotation of the rod 96, the rod 114 will be driven through the belts 134 and 135. Since in both instances the drive is from a larger pulley to a smaller pulley, the rod 114 will be rotated at a greater speed than the rod 96.

The rollers 122 and 124 are for the purpose of driving the leading edge of the sheet 70 into engagement with the trailing edge of the sheet prior to and during the passage of the edges across a recording and reproducing head, as will be explained more fully hereinafter. However, it will here be noted that the three pulleys 104, 130 and 120 are each provided with flange portions adjacent the endless belts to aid in gripping the latter, whereas the pulley 128 is provided with a slightly convex smooth surface which will more readily permit slippage of the belt 134. Accordingly, after the leading edge of the sheet 70 has been driven into engagement with the trailing edge of the sheet by the rollers 122 and 124, the belt 134 will slip on the pulley 128 so as to permit the latter rollers to be driven at substantially the same peripheral speed as the rollers 94 and 95.

Four spring loaded back-up rollers are provided, one for cooperation with each of the four rollers 94, 95, 122 and 124. A roller support member 137 (best shown in FIGURES 8 and 9) is mounted against the underside of the upper portion 75 of the inner guide wall 68 and secured thereto by a pair of screws 138 and 139. In addition, a pair of braces 141 extend between the underside of the member 137 and the bottom portion 76 of the inner guide wall. The upper ends of the screws 138 and 139 do not project through the guide wall and thus do not interfere with the passage of the sheet 70 through the guide. The upper portion of the support member 37 is provided with a pair of longitudinal generally semicircular groves 140 and 142 for receiving a pair of rods 144 and 146.

Figure 12:
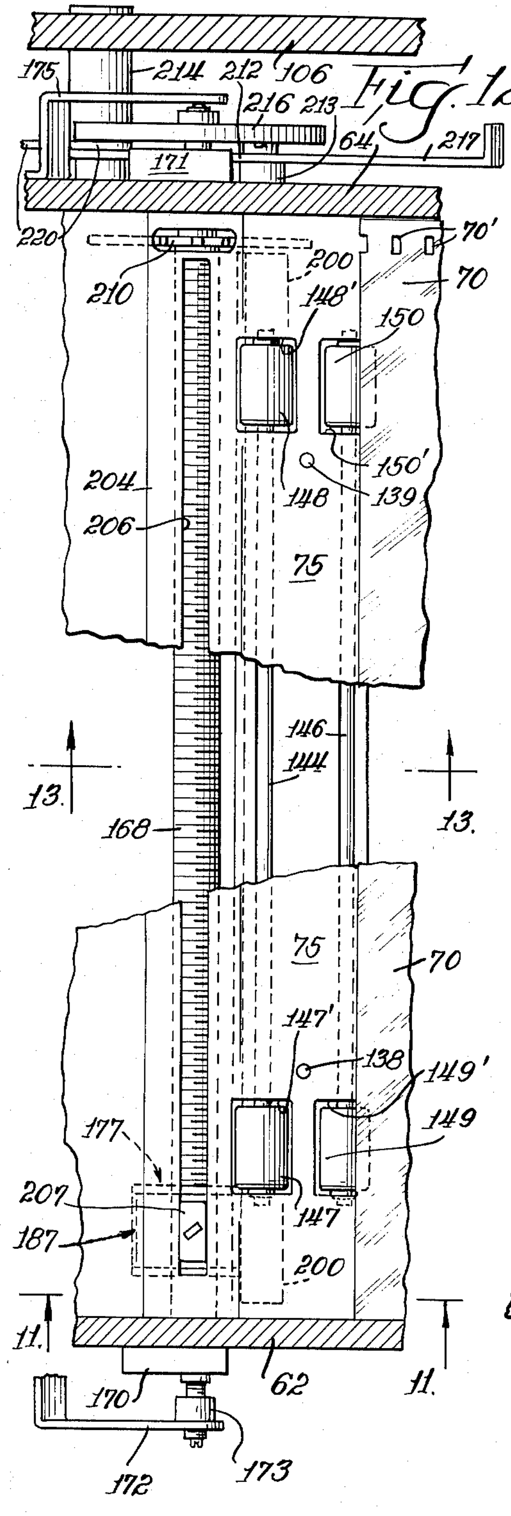
FIGURE 12 is a longitudinal section with certain portions broken away taken substantially along the line 12—12 of FIGURE 13.

The rod 144 has mounted thereon a pair of back-up rollers 147 and 148 which are spaced along the rod so as to be disposed directly under the rollers 94 and 95 respectively. In a similar manner, the rod 146 has mounted thereon a pair of back-up rollers 149 and 150 which are spaced thereon so as to be disposed directly under the rollers 122 and 124. Apertures 147′, 148′, 149′ and 150′ are provided in the upper portion 75 of the inner guide wall 68 to permit the back-up rollers to project therethrough and engage the record sheet 70. Referring to FIGURES 8 and 12, the upper portion 152 of the support member 137 which has the longitudinal grooves 140 and 142 formed therein extends lengthwise substantially the full distance between the pair of back-up rollers 147 and 149 and the pair of back-up rollers 148 and 150 so as to provide support for the rods 144 and 146.

Figure 9:
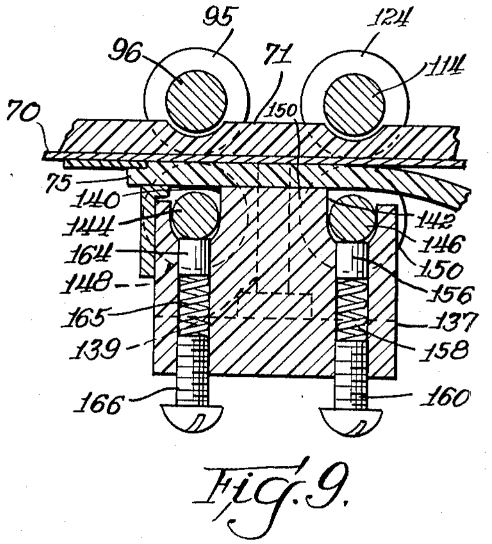
FIGURE 9 is an enlarged partial vertical section taken substantially along the line 9—9 of FIGURE 8.

FIGURES 8 and 9 show the manner in which the back-up rollers are spring loaded upwardly so as to urge the sheet 70 against the corresponding driven roller mounted immediately thereabove. The supporting member 137 is provided with a pair of vertical holes in alignment with the rod 146 and a pair of short pin members 154 and 156 are positioned in said holes respectively and urged upwardly by corresponding compression springs 157 and 158. A pair of screws 159 and 160 are threaded into the underside of the support member to bear against the springs 157 and 158 and hold them in position. In this manner, the rollers 149 and 150 are yieldingly urged upwardly toward rollers 122 and 124, the spring pressure being adjustable through rotation of the screws 159 and 160. It will be noted that the pin 154 is seated in a groove 162 in the rod 146 so as to maintain the latter in its desired axial position.

The back-up rollers 147 and 148 are urged upwardly toward the drive rollers 94 and 95 in substantially the same manner as described hereinabove. FIGURE 9 shows a short pin 164, a compression spring 165, and a screw 166 for yieldingly urging the rod 144 upwardly, and similar means are provided toward the opposite end of the rod 144 adjacent the back-up roller 147.

Mechanism will now be described for feeding a recording and reproducing head across the path of travel of the sheet at a speed which is directly related to the speed of travel of the sheet. A horizontal feed screw 168 extends substantially the full length of the guide 66 and is positioned inside the inner guide wall 68 (see FIGURES 8 and 11) with its end portions mounted in bearings supported in bearing support plates 170 and 171 which are secured to the side walls 62 and 64, respectively. An arm 172 is secured to the side wall 62 and has a socket 173 mounted on its end which carries a threaded pin 174 adapted to bear against the adjacent end of the feed screw 168. An arm 175 is affixed to the side wall 64 so as to bear against the opposite end of the screw 168. It will thus be understood that the arms 172 and 175 control the axial position of the feed screw 168, and that minor adjustments of such position may be made by rotation of the threaded pin 174.

Figure 10:
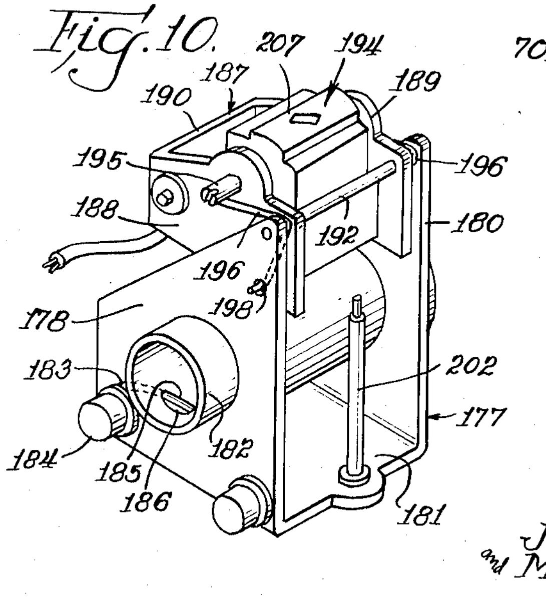
FIGURE 10 is an enlarged perspective view of a magnetic recording and reproducing head assembly which forms a part of the apparatus of FIGURE 6.

FIGURE 10 shows a magnetic recording and reproducing head assembly comprising a generally U-shaped carriage 177 having a pair of upright legs 178 and 180 and a bight portion 181. The arms 178 and 180 are apertured to receive a tubular member 182 which is adapted to be mounted on the feed screw 168 so as to be driven along the feed screw upon rotation of the latter. The tube 182 may be provided with internal threads for this purpose, although in the present embodiment a short length of wire 183 has one end secured to the leg 178 by a clamping screw 184 and its other end 185 projects through an aperture 186 in the tube wall so as to extend through to the interior of the tubular member. It will thus be seen that the end 185 of the wire 184 will travel in the threads formed on the feed screw 168 so as to cause axial movement of the carriage 177 along the feed screw upon rotation of the latter.

A generally horizontal U-shaped bracket 187 comprising a pair of legs 188 and 189 and an intermediate portion 190 is pivotally mounted between the legs 178 and 180 by a pivot pin 192. A recording and reproducing head 194 is mounted between the legs 188 and 189 by a pin 195, and a torsion spring 196 is assembled on the end of the pin 192 with one end anchored to the leg 178 at 198 and the other end engaged against the pin 195. The spring 196 thus biases the bracket 187 and head 194 in a clockwise direction about pin 192 when viewed as in FIGURE 10. A similar torsion spring may be provided at the opposite side of the head assembly.

FIGURE 11 shows the position of the head assembly when mounted on the feed screw 168 so as to be driven thereby across the path of travel of the sheet 70. It will be seen that the edges of the legs 178 and 180 are disposed adjacent the side of a guide rail 200 which is secured to the underside of the uper portion 75 of the inner guide wall. A long stud 202 (see FIGURE 10) projects upwardly from the bight portion 181 and is positioned with its upper end adjacent to the bottom edge of the guide rail 200.

FIGURE 6 shows a thin strip of brass 204 which is mounted in a cutout portion of the upper section 75 of the inner guide wall and extends substantially the full length of the guide 66. The strip 204 has a longitudinal slot 206 through which an upper end 207 of the head projects, whereby the head is adapted to make intimate contact with the sheet 70 as the latter is driven through the guide. It will be understood that the head 194 is yieldingly urged upwardly toward the sheet by the torsion spring 196.

It is an important feature of the present invention that the movement of the sheet 70 is utilized to feed the head 194 across the path of travel of the sheet. Such an arrangement provides improved correlation between the speed of travel of the sheet and the speed of travel of the head, and results in improved reproduction of sound from the record sheet. In the embodiment being described, a sprocket wheel 210 is fixedly mounted on one end of the feed screw 168 and is positioned so as to project upwardly through an opening in the inner guide wall 68 and in the brass strip 204 whereby it will engage in sprocket holes 70' (see FIGURE 12) provided in the sheet and thereby be driven by the sheet. In this manner, the sheet 70 as it moves through the guide 66 will itself cause the feed screw 168 to be rotated and the head 194 to be fed across the path of travel of the sheet.

FIGURES 7 and 8 shows mechanism for returning the head to its starting position after a recording or reproducing operation has been completed. A bellcrank 212 is pivotally mounted on the side plate 64 by a pin 213, and on one end of the bellcrank there is mounted a roller 214 of sufficient length to simultaneously engage the rim of the flywheel 106 and also the rim of a rubber tired wheel 216 which is fixedly mounted on the adjacent end of the feed screw 168. When an arm portion 217 of the bellcrank is moved downwardly, the roller 214 will thus contact flywheel 106 and the wheel 216 so as to provide a driving connection between the flywheel and the feed screw 168 to rotate the latter in a direction opposite to the direction of rotation effected by movement of the record sheet. Thus, when the sheet 70 has been ejected from the guide 66 and it is desired to return the head 194 to its original position, it is simply necessary to depress the bellcrank arm 217. A hook 220 is provided for hooking over the arm 175 if it is desired to lock the bellcrank 212 in its operative position.

In operation, a record sheet such as the sheet 70 is inserted into the guide 66 through the opening 82 whereby the leading edge is engaged between the driven rollers 122 and 124 and the corresponding back-up rollers 149 and 150 and is thus fed inwardly between the driven rollers 94 and 95 and their corresponding back-up rollers 147 and 148. With the gate 84 in closed position, the sheet 70 will be continuously moved through the convolute path formed by the guide 66, and through its cooperation with the sprocket wheel 210 the sheet will rotate the latter and the feed screw 168 so as to cause the head 194 to be fed across the path of travel of the sheet.

As the leading and trailing edges of the sheet reach the driven rollers 122 and 124, there will be a gap therebetween as shown in FIGURE 11. However, as the leading edge moves under the rollers 122 and 124 it will be driven into engagement with the trailing edge due to the fact that the latter rollers are driven at a greater peripheral speed than the rollers 94 and 95, and in this manner the magnetic medium gap will be reduced to a minimum until after the edges of the sheet have passed across the head 194. After the leading edge has been driven into engagement with the trailing edge, the belt 135 will slip on the pulley 128 so as to permit the rollers 122 and 124 to rotate at substantially the same peripheral speed as the rollers 94 and 95.

Figure 13:
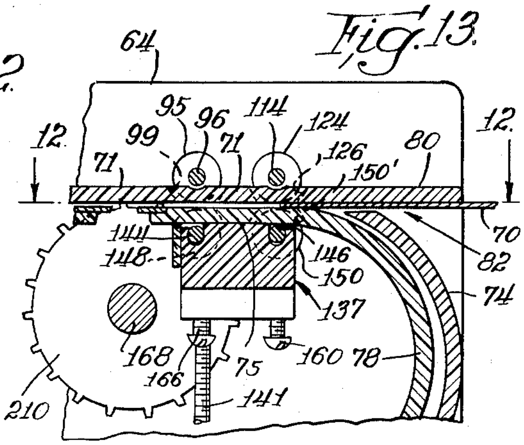
FIGURE 13 is a fragmentary vertical section taken substantially along the line 13—13 of FIGURE 12 showing a sheet being fed into the recording and reproducing apparatus.
Figure 14:
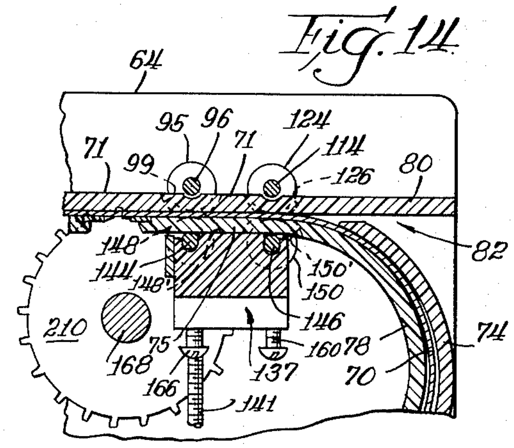
FIGURE 14 is a view similar to FIGURE 13 showing the sheet with the leading edge driven into engagement with the trailing edge.
Figure 15:
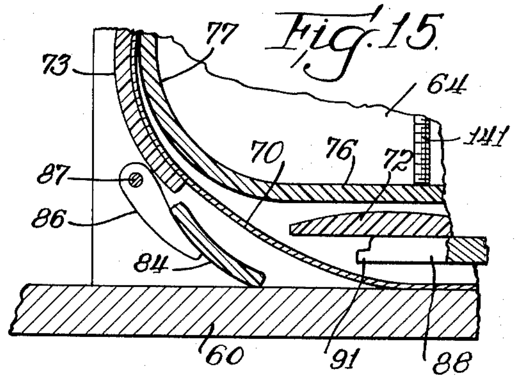
FIGURE 15 is a fragmentary vertical section taken substantially along the line 13—13 of FIGURE 12 showing a gate in open position to permit ejection of a sheet from the apparatus.

FIGURE 13 shows the sheet being inserted into the guide, FIGURE 11 shows the gap between the edges of the sheet, and FIGURE 14 shows the sheet after the leading edge has been driven into engagement with the trailing edge. When it is desired to eject the sheet, the arm 88 is rotated to permit the gate 84 to drop open, whereupon the record sheet will be driven out of the guide as shown in FIGURE 15. After the sheet has been ejected from the guide, the bellcrank 212 is actuated to effect a driving connection between the flywheel 106 and the rubber tired wheel 216 on the feed screw 168 so as to return the head 194 to its original position adjacent the left hand end of the slot 206 in FIGURE 6.

While we have illustrated our invention in certain preferred forms, we do not intend to be limited to such forms, except insofar as the appended claims are so limited, since modifications coming within the scope of our invention will be readily suggested to others with our disclosure before them.

We claim:

1. A magnetic recording and reproducing device adapted to handle a record in the form of a sheet of magnetic material comprising a guide including spaced inner and outer walls for receiving said sheet and forming a convolute path of travel for said sheet, a sprocket rotatably mounted adjacent said path of travel for driving said sheet through repeated cycles of travel around said path, feed roller means disposed adjacent said sprocket for feeding the leading edge of said sheet into engagement with the trailing edge of said sheet and into operative engagement with said sprocket, a recording and pickup head movably mounted in operative engagement with said sheet, means for feeding said head across the path of travel of said sheet, and drive means operatively associated with said sprocket, said feed roller means, and said head feeding means.

2. A magnetic recording and reproducing device adapted to handle a record in the form of a sheet of magnetic material comprising a guide for receiving said sheet and forming a convolute path of travel for said sheet, a sprocket rotatably mounted adjacent said path of travel for driving said sheet through repeated cycles of travel around said path, means disposed adjacent said sprocket for driving and feeding the leading edge of said sheet into engagement wtih the trailing edge of said sheet and into operative engagement with said sprocket, a recording and pickup head movably mounted in operative engagement with said sheet, means for feeding said head across the path of travel of said sheet, and drive means operatively associated with said sprocket, said edge feeding means, and said head feeding means.

3. A magnetic recording and reproducing device adapted to handle a record in the form of a sheet of magnetic material comprising means for receiving said sheet and forming a convolute path of travel for said sheet, means mounted adjacent said path of travel for driving said sheet through repeated cycles of travel around said path, means adjacent said path of travel for driving and feeding the leading edge of said sheet into engagement with the trailing edge of said sheet and into operative engagement with said sheet driving means, a recording and pickup head movably mounted in operative engagement with said sheet, means for feeding said head across the path of travel of said sheet, and drive means operatively associated with said sheet driving means, said edge feeding means, and said head feeding means.

4. A magnetic recording and reproducing device adapted to handle a record in the form of a sheet of magnetic material comprising a guide including spaced inner and outer guide surfaces for receiving said sheet and forming a convolute path of travel for said sheet, means mounted adjacent said path of travel for driving said sheet through repeated cycles of travel around said path, means disposed adjacent said sheet driving means for driving and feeding the leading edge of said sheet into abutting relationship with the trailing edge of said sheet and into operative engagement with said sheet driving means, a recording and pickup head movably mounted in operative engagement with said sheet, and means for feeding said head across the path of travel of said sheet.

5. A magnetic recording and reproducing device adapted to handle a record in the form of a sheet of magnetic material having recording lines angularly disposed thereon comprising a guide for receiving said sheet and connecting said lines to provide a continuous recording line, a sprocket rotatably mounted adjacent said guide for driving said sheet through repeated cycles of travel within said guide, feed roller means disposed adjacent said sprocket for driving and feeding the leading edge of said sheet into operative engagement with the trailing edge of said sheet, a recording and pickup head movably mounted in operative engagement with said sheet and including pole pieces disposed at an acute angle to said edges, means for feeding said head across the path of travel of said sheet, and drive means operatively associated with said sprocket, said feed roller means, and said head feeding means.

6. A magnetic recording and reproducing device adapted to handle a record in the form of a sheet of magnetic material having recording lines angularly disposed thereon comprising a guide for receiving said sheet and connecting said lines to provide a continuous recording line, means for driving said sheet through repeated cycles of travel within said guide, feed roller means disposed adjacent said sheet driving means for driving and feeding the leading edge of said sheet into operative engagement with the trailing edge of said sheet. a recording and pickup head movably mounted in operative engagement with said sheet and including pole pieces disposed at an acute angle to said edges, and means for feeding said head across the path of travel of said sheet.

7. A magnetic recording and reproducing device adapted to handle a record in the form of a sheet of magnetic material having parallel recording lines disposed thereon comprising a guide for receiving said sheet and connecting said lines to provide a continuous recording line, means for driving said sheet through repeated cycles of travel within said guide, means adjacent the path of travel of said sheet for driving and feeding the leading edge of said sheet into operative engagement with the trailing edge of said sheet, a recording and pickup head mounted in operative engagement with said sheet and including pole pieces disposed at an acute angle to said edges, and means for providing relative transverse movement of said head with respect to said sheet.

8. A magnetic recording and reproducing device adapted to handle a record in the form of a sheet of magnetic material having recording lines angularly disposed thereon comprising a playing mechanism for receiving said sheet and bending it into a convolute form for travel through repeated cycles, means adjacent the path of travel of said sheet for driving and feeding the leading edge of said sheet into operative engagement with the trailing edge of said sheet, a recording and pickup head movably mounted in operative engagement with said sheet and including pole pieces disposed at an acute angle to said edges, and means for feeding said head across the path of travel of said sheet.

9. A magnetic recording and reproducing device adapted to handle a record in the form of a sheet of magnetic material comprising a stationary guide including spaced stationary inner and stationary outer guide surfaces for receiving said sheet therebetween and forming a convolute path of travel for said sheet, said stationary inner and stationary outer guide surfaces being arranged so that they extend along in closely adjacent relation to one another and define between them said path for a moving sheet, sheet drive means mounted adjacent said path of travel for driving said sheet through repeated cycles of travel around said path, said sheet drive means being engageable with successive portions of a moving sheet as the sheet passes thereby, a recording and pickup head movably mounted in operative engagement with said sheet, and means for feeding said head across the path of travel of said sheet.

10. The combination of claim 9 wherein said outer guide surface is provided with a gate movable between open and closed positions, said gate being located at an arcuate portion in the path of travel of said sheet so that when said gate is moved to open position a sheet traveling in said guide will pass through said gate and be ejected from said guide.

11. A magnetic recording and reproducing device adapted to handle a record in the form of a sheet of magnetic material comprising a stationary guide including spaced stationary inner and stationary outer guide walls for receiving said sheet therebetween and forming a convolute path of travel for said sheet, said stationary inner and stationary outer guide walls being arranged so that they extend along in closely adjacent relation to one another and define between them said path for a moving sheet, said walls having generally semi-circular end portions and substantially flat parallel portions intermediate said end portions, sheet drive means mounted adjacent said path of travel for driving said sheet through repeated cycles of travel around said path, said sheet drive means being engageable with successive portions of a moving sheet as the sheet passes thereby, a recording and pickup head movably mounted in operative engagement with said sheet, and means for feeding said head across the path of travel of said sheet.

12. A magnetic recording and reproducing device adapted to handle a record in the form of a sheet of magnetic material comprising means for receiving said sheet and forming a convolute path of travel for said sheet, means mounted adjacent said path of travel for driving said sheet through repeated cycles of travel around said path, a recording and pickup head movably mounted in operative engagement with said sheet, and head drive means for feeding said head across the path of travel of said sheet, said head drive means being engaged by said sheet and driven by said sheet as the latter moves through said convolute path.

13. A magnetic recording and reproducing device adapted to handle a record in the form of a sheet of magnetic material comprising a guide including spaced inner and outer stationary guide surfaces for receiving said sheet and forming a convolute path of travel for said sheet, means mounted adjacent said path of travel for driving said sheet through repeated cycles of travel around said path, a recording and pickup head movably mounted in operative engagement with said sheet, and head drive means for feeding said head across the path of travel of said sheet, said head drive means being engaged by said sheet and driven by said sheet as the latter moves through said convolute path.

14. A magnetic recording and reproducing device adapted to handle a record in the form of a sheet of magnetic material comprising means for receiving said sheet and forming a convolute path of travel for said sheet, means mounted adjacent said path of travel for driving said sheet through repeated cycles of travel around said path, a recording and pickup head movably mounted in operative engagement with said sheet, means responsive to movement of said sheet for feeding said head across the path of travel of said sheet, and means adjacent the path of travel of said sheet for feeding the leading edge of said sheet into engagement with the trailing edge of said sheet prior to and during the passage of said edges across said head.

15. The invention of claim 14 wherein said edge feeding means comprises at least one feed roller adapted to be driven at a peripheral speed greater than normal speed of said sheet and adapted to engage the sheet so as to feed the leading edge of said sheet into engagement with the trailing edge of said sheet.

16. The invention of claim 15 comprising a drive mechanism for said edge feeding means including slippage means adapted to permit the feed roller to rotate at a reduced speed after said leading edge has been moved into engagement with said trailing edge.

17. A magnetic recording and reproducing device adapted to handle a record in the form of a sheet of magnetic material having sprocket holes therein comprising means for receiving said sheet and forming a convolute path of travel for said sheet, means mounted adjacent said path of travel for driving said sheet through repeated cycles of travel around said path, a recording and pickup head movably mounted in operative engagement with said sheet, a sprocket wheel engageable in said sprocket holes so as to be rotated by the sheet itself in response to movement of said sheet, and means actuated by said sprocket wheel for feeding said head across the path of travel of said sheet.

18. The invention of claim 17 wherein means are provided adjacent the path of travel of said sheet for feeding the leading edge of said sheet into engagement with the trailing edge of said sheet prior to and during the passage of said edges across said head.

19. A magnetic recording and reproducing device adapted to handle a record in the form of a sheet of magnetic material having sprocket holes therein comprising a guide including spaced inner and outer stationary walls for receiving said sheet and forming a convolute path of travel for said sheet, first drive roller means mounted adjacent said path of travel for driving said sheet through repeated cycles of travel around said path, a recording and pickup head movably mounted in operative engagement with said sheet, a sprocket wheel adapted to engage in said sprocket holes so as to be rotated in response to movement of said sheet, means actuated by said sprocket wheel for feeding said head across the path of travel of said sheet, and second feed roller means for feeding the leading edge of said sheet into engagement with the trailing edge of said sheet prior to and during the passage of said edges across said head.

20. The invention of claim 19 wherein said second feed roller means is adapted to be driven at a greater peripheral speed than said first feed roller means for feeding the leading edge of said sheet into engagement with the trailing edge of said sheet, and a drive mechanism for said second feed roller means including slippage means to permit said second feed roller means to rotate at substantially the same peripheral speed as said first feed roller means after said leading edge has been driven into engagement with said trailing edge.

21. A magnetic recording and reproducing device adapted to handle a record in the form of a sheet of magnetic material having sprocket holes therein, comprising a guide including spaced inner and outer stationary walls for receiving said sheet and forming a convolute path of travel for said sheet, said walls having generally semicircular end portions and substantially flat parallel portions intermediate said end portions, a gate provided in said outer wall movable between open and closed positions whereby when said gate is moved to open position a sheet traveling in said guide will be ejected therefrom, first drive roller means mounted adjacent said path of travel for driving said sheet through repeated cycles of travel around said path, a recording and pickup head movably mounted in operative engagement with said sheet, a sprocket wheel adapted to engage in said sprocket holes so as to be rotated in response to movement of said sheet, means actuated by said sprocket wheel for feeding said head across the path of travel of said sheet, second feed roller means for feeding the leading edge of said sheet into engagement with the trailing edge of said sheet prior to and during the passage of said edges across said head, said second feed roller means being adapted to be driven at a greater peripheral speed than said first feed roller means, and drive means for said second feed roller means including slippage means to permit said second feed roller means to rotate at substantially the same peripheral speed as said first feed roller means after said leading edge has been driven into engagement with said trailing edge.

22. A magnetic recording and reproducing device adapted to handle a record in the form of a sheet of magnetic material comprising means for receiving said sheet and forming a convolute path of travel for said sheet, means mounted adjacent said path of travel for driving said sheet through repeated cycles of travel around said path, a recording and pickup head movably mounted in operative engagement with said sheet, means for feeding the head across the path of travel of said sheet, and means adjacent the path of travel of said sheet for periodically feeding the leading edge of said sheet into engagement with the trailing edge of said sheet prior to and during the passage of said edges across said head.

References Cited by the Examiner

UNITED STATES PATENTS

| | | | |
|---|---|---|---|
| 2,926,920 | 3/1960 | Lorenz | 274—4 |
| 2,931,692 | 4/1960 | Yontar | 274—4 X |
| 2,955,896 | 10/1960 | Fritzinger | 274—4 X |
| 2,966,357 | 12/1960 | Fritzinger | 274—4 |
| 2,994,746 | 8/1961 | Collier et al. | 274—4 X |

NORTON ANSHER, *Primary Examiner.*